US006395413B1

(12) United States Patent
Ando

(10) Patent No.: US 6,395,413 B1
(45) Date of Patent: May 28, 2002

(54) PERPENDICULAR MAGNETIC RECORDING MEDIUM

(75) Inventor: Toshio Ando, Kamakura (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/407,362

(22) Filed: Sep. 29, 1999

(30) Foreign Application Priority Data

Sep. 30, 1998 (JP) .......................................... 10-277116

(51) Int. Cl.⁷ .............................. G11B 5/66; G11B 5/70
(52) U.S. Cl. ............................ 428/694 T; 428/694 TS; 428/694 TM
(58) Field of Search ........................ 428/694 T, 694 TS, 428/900, 694 TM

(56) References Cited

U.S. PATENT DOCUMENTS

| | | | |
|---|---|---|---|
| 4,731,300 A | * 3/1988 | Watanabe et al. | 428/636 |
| 4,745,510 A | * 5/1988 | Watanabe et al. | 360/131 |
| 4,792,486 A | * 12/1988 | Ishizaka et al. | 428/336 |
| 4,798,765 A | * 1/1989 | Ishizaka et al. | 428/336 |
| 5,147,732 A | * 9/1992 | Shiroishi et al. | 428/668 |
| 5,846,648 A | * 12/1998 | Chen et al. | 428/332 |
| 5,945,190 A | * 8/1999 | Sato | 428/65.3 |
| 6,129,981 A | * 10/2000 | Okuyama et al. | 428/332 |

FOREIGN PATENT DOCUMENTS

| JP | 61211022 | 10/1986 |
|---|---|---|
| JP | 61222023 | 10/1986 |

OTHER PUBLICATIONS

Paper of "Journal of Magnetism and Magnetic Materials, 176 (1997) 25–30" Pages 25 through 30 Title: "Addition of Third Elements to Co–Cr Media" Authors: Keitoku et al.

* cited by examiner

Primary Examiner—Paul Thibodeau
Assistant Examiner—Holly C. Rickman
(74) Attorney, Agent, or Firm—Anderson Kill + Olick, P.C.; Eugene Lieberstein; Michael N. Meller

(57) ABSTRACT

A perpendicular magnetic recording medium having an excellent thermal stability of the recorded signal and S/N and a low medium noise, and capable of easily forming a perpendicular magnetic recording layer is provided. The perpendicular magnetic recording medium has, at least, a perpendicular magnetic recording layer having a hexagonal closest packing (hcp) structure of which c-axis is perpendicular to a surface of the perpendicular magnetic recording layer, on a non-magnetic base, wherein the perpendicular magnetic recording layer has a saturation magnetization Ms of not more than 400 emu/cc, and a lattice constant c of the hexagonal closest packing structure is not more than 4.07 Å.

3 Claims, 5 Drawing Sheets

Fig. 4

| Vertical Rec. Layer | Lattice Constant C (Å) | Ms (emu/cc) | Hc (Oe) | S/N (dB) |
|---|---|---|---|---|
| A. Co-Cr-Nb-Ta | 4.060 | 290 | 3020 | 33.6 |
| B. Co-Cr-Ta | 4.082 | 520 | 2980 | 31.4 |
| C. Co-Cr-Ta | 4.078 | 290 | 2000 | 32.6 |

PERPENDICULAR MAGNETIC RECORDING MEDIUM

BACKGROUND OF THE INVENTION

1. Field of the Invention

The present invention is related to perpendicular magnetic recording mediums, particularly, related to a perpendicular magnetic recording medium containing a perpendicular recording layer having a saturation magnetization Ms of not more than 400 emu/cc and a lattice constant c of not more than 4.07 Å.

2. Description of the Related Arts

Generally, in a perpendicular magnetic recording medium applied to a magnetic tape, a magnetic card and a magnetic disc, a perpendicular magnetic recording layer is, at least, formed on a non-magnetic substrate shaped in the form of a tape, card or disc. Recently, the perpendicular magnetic recording medium has been given an attention to, and has been actively developed because of capability of its high density recording on the perpendicular magnetic recording layer by perpendicularly recording a recording signal such as a video signal, a sound signal and a digital data thereon.

As this kind of the perpendicular magnetic recording layer, a Co—Cr system alloy thin film has been vigorously studied because of its strong perpendicular anisotropy and its excellent magnetic recording characteristics. The crystalline structure of the Co—Cr system alloy thin film has a hexagonal closest packed structure (hcp) and it is possible to obtain a strong perpendicular magnetic anisotropy by approximately orienting a c-axis, which is a magnetization easy axis, perpendicular to a surface of the thin film.

On the other hand, a high coercivity is required for the recording medium to obtain a high output level and a high S/N as well as a high density recording. Especially, in the case of the perpendicular magnetic recording medium, a high perpendicular coercivity is important to maintain a high security of recorded signals other than a high output level and a high S/N, otherwise, the recorded signal is easily degraded due to thermal relaxation because a squareness ratio Rs=Mr/Ms (a ratio of a perpendicular remanent magnetization Mr to a saturation magnetization Ms) is decreased since a demagnetizing field generated in a perpendicular direction corresponding to a thickness of the thin film is very high due to an extremely small thickness of the thin film compared with other dimensions in inner plane directions of the thin film.

Thus, in order to enhance the coercivity Hc of the perpendicular magnetic recording medium, there are proposed some methods in the prior arts. As one of the examples, there has been studied a method where a third element such as Ta, Zr, Nb and Pt is added to Co—Cr system alloy. Thereby, it is possible to obtain a coercivity of nearly 3,000 Oe by adding Pt of 10 at %, and about 2,600 Oe by adding other elements other than Pt thereto.

Further, as another example, there has been studied another one for forming a multi-layer with a superlattice such as Pt/Co, Pd/Co, Pd/CoCr, or Pt/CoCrTa. In any multi-layers with the superlattice, it is possible to obtain a high coercivity Hc of not less than 3,000 Oe and a squareness ratio of not less than 0.9, resulting in that excellent magnetic recording characteristics are apparently obtained due to an exchange interaction of the multi-layer.

However, in the former example to enhance the coercivity of the perpendicular magnetic recording medium in the prior art, i.e., the method of adding Pt of no less than 10% to Co—Cr system alloy, there are problems that a cost performance is degraded because of a high cost of the element Pt, and a saturation magnetization Ms becomes not less than 410 em/cc. When the saturation magnetization Ms is too high, a recording medium noise increases, resulting in a degradation of S/N of the recording medium.

Further, in the case where an element other than the element Pt is added to Co—Cr system alloy, it is possible to obtain a high coercivity Hc of not less than 2,500 Oe along with a saturation magnetization of nearly 300 emu/cc. However, in this case, it is necessary to raise a temperature of the substrate to not less than 400° C. when the perpendicular magnetic film is formed thereon. This causes a problem of a selective limitation that a high heatproof material has to be employed as the non-magnetic substrate. In addition, it requires a large power source and a heatproof apparatus to heat the non-magnetic substrate and further production processes for heating and cooling the non-magnetic substrate.

On the other hand, in the later example to enhance the coercivity of the perpendicular magnetic recording medium in the prior art, when the multi-layer with the superlattice is formed on the non-magnetic substrate, the exchange interaction thereof is apt to causes a recording medium noise, resulting in a degradation of S/N. Further, the production process becomes complicated because of the multi-layer.

SUMMARY OF THE INVENTION

Accordingly, it is a general object of the present invention to provide a perpendicular magnetic recording medium in which the above disadvantages have been eliminated.

It is a more specific object of the present invention to provide a perpendicular magnetic recording medium comprising, at least, a perpendicular magnetic recording layer having a hexagonal closest packing (hcp) structure of which c-axis is perpendicular to a surface of the perpendicular magnetic recording layer, on a non-magnetic substrate, wherein the perpendicular magnetic recording layer has a saturation magnetization Ms of not more than 400 emu/cc, and a lattice constant c of the hcp structure is not more than 4.07 Å.

BRIEF DESCRIPTION OF THE DRAWINGS

FIG. 4 is a table showing various kinds of characteristics of a perpendicular magnetic recording medium of the present invention and comparative examples.

DETAILED DESCRIPTION OF THE PREFERRED EMBODIMENTS

Figure 1:
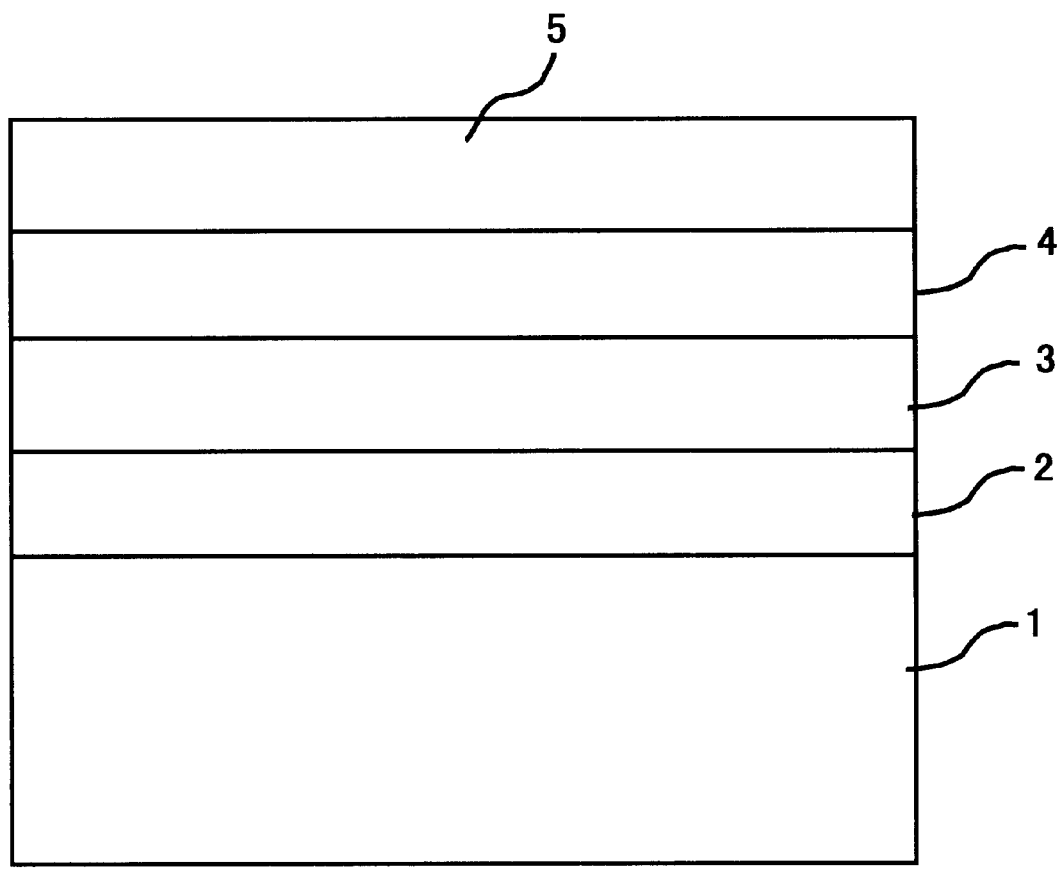
FIG. 1 is a schematic sectional view showing a structure of a perpendicular magnetic recording medium of the present invention.

Next, a description is given of a perpendicular magnetic recording medium of an embodiment of the present invention with referring to FIGS. 1 to 5.

The perpendicular magnetic recording medium of the present invention is applied to magnetic tapes, magnetic cards and magnetic discs. The perpendicular magnetic recording medium comprises a non-magnetic substrate shaped in the form of a tape, card or disc, and a magnetic recording layer formed on the non-magnetic substrate. The perpendicular magnetic recording layer has a hexagonal closest packed structure (hcp) containing a main component of Co, of which c-axis is approximately perpendicular to a surface of the perpendicular magnetic recording medium (c-axis dispersion angle $\Delta\theta50$ is not more than 7 deg). Further, the perpendicular magnetic recording layer has a saturation magnetization of not more than 400 emu/cc and a lattice constant C of not more than 4.07 Å.

In order to satisfy these conditions, for example, a 4-element system alloy of Co—Cr–Nb—Ta is employed as a material of the perpendicular magnetic recording layer. When component ratios of Nb and Ta in the 4-element system alloy are represented as x (at %) and y (at %), respectively, the 4-element system alloy of the present invention satisfies inequalities (1) through (2) as follows:

$$x+y \geq 2 \quad (1)$$

$$3x/4+y \leq 3 \quad (2)$$

wherein x and y are each above zero.

Under this condition, it is possible to form a perpendicular magnetic layer as a single layer on the non-magnetic substrate under a comparatively low temperature of less than 300° C. by selecting respective component ratios of the elements with respect to the 4-element system alloy of Co—Cr—Nb—Ta so that a saturation magnetization thereof becomes to be not more than 400 emu/cc, resulting in the perpendicular magnetic recording layer having a high coercivity Hc of not less than 2,500 Oe and a squareness ratio of not less than 0.6. Thereby, it is possible to obtain a perpendicular magnetic recording layer having an excellent thermal stability, a high output level and an excellent S/N with a low medium noise. Further, it is possible to provide the perpendicular magnetic recording medium in a low cost because a high cost material is not used for the components in the medium.

In the perpendicular magnetic recording medium mentioned above, the description is given of the example where the perpendicular magnetic recording layer is formed as a single layer of the 4-element system alloy of Co—Cr—Nb—Ta.

However, it is possible to form a soft magnetic underlayer of a Co—Zr system amorphous under the perpendicular magnetic recording layer so that atoms of the perpendicular magnetic recording layer are directly coupled with atoms of the soft magnetic under layer. Thereby, the c-axis of the perpendicular magnetic recording layer is easily oriented perpendicular to the surface thereof, resulting in enhancement of a recording/reproducing sensitivity.

Further, in the above perpendicular magnetic recording medium, a hard magnetic pinning layer may be formed under the soft magnetic layer of the Co—Zr system amorphous to suppress the formation of domain walls of the soft magnetic layer thereof. The hard magnetic pinning layer is effective to secure a low noise and a thermal stability of recorded signals to strong magnetic fields.

Embodiment

FIG. 1 is a schematic sectional view showing a structure of a perpendicular magnetic recording medium of the present invention.

Upon manufacturing the perpendicular magnetic recording medium of the present invention, a magnetron sputtering method was employed in all the processes where the perpendicular magnetic recording layer was formed on the non-magnetic substrate.

In this embodiment, as the non-magnetic substrate, there was employed a soda lime glass substrate (referred to as substrate) 1 having a mirror-polished disc-like shape. First, a hard magnetic pinning layer 2 was formed thereon by sputtering a $Co_{83}$–$Sm_{17}$ (at %) layer at a thickness of 150 nm under a condition of the room temperature of the non-magnetic substrate 1.

Next, under the condition of the room temperature of the non-magnetic substrate 1, a Co—Zr system soft magnetic under layer 3 was formed by coating a Co—$Zr_5$—$Nb_4$ (at %) on the pining layer 2 at a thickness of 600 nm.

After that, a perpendicular magnetic recording layer 4 was immediately formed on the Co—Zr system soft magnetic under layer 3. As the above perpendicular magnetic recording layer 4, there were formed various kinds of perpendicular magnetic recording layer by changing component ratios of Co—Cr—Nb—Ta system alloy under a substrate temperature of 250° C. for experiment. Upon forming the respective layers, a magnetic field of about 50 Oe was applied in a radial direction of the non-magnetic substrate 1 by using a magnet of magnetron in the sputtering apparatus, resulting in that magnetization and magnetization easy axes of the hard magnetic pinning layer 2 and the Co—Zr system soft magnetic under layer 3 were easily oriented in the radial direction of the non-magnetic substrate 1.

Further, a protection layer 5 was formed on the perpendicular magnetic recording layer 4 by sputtering carbon at a thickness of 5 nm.

At that time, the compositions of the perpendicular magnetic recording layer 4 was measured by using ICP (Inductively Coupled Plasma) emission spectrochemical analysis, and the coercivity Hc and the squareness ratio Rs thereof were measured by Kerr effect. The lattice constant c was measured from a signal peak angle of a (002) plane by using X-ray diffraction, and a c-axis dispersion angle was evaluated as a half-width $\Delta\theta50$ of a rocking curve of (002) plane.

Further, upon recording a recording signal on the perpendicular magnetic recording layer 4, there was used an inductive single pole type (SPT) head having a track width of 10 μm, a main magnetic pole thickness of 0.2 μm and a coil of 26 turns. On the other hand, upon reproducing the recorded signal, a magnetoresistive (MR) head having a track width of 2.6 μm was used. Upon measuring magnetic characteristics of the samples, the soda lime glass substrate 1 was rotated under conditions of a linear velocity of 7 m/sec and a head flying height of 50 nm. Further, the S/N and a medium noise characteristic were measured under conditions of a bandwidth of 25 MHz and a resolution bandwidth of 30 KHz.

Figure 2:
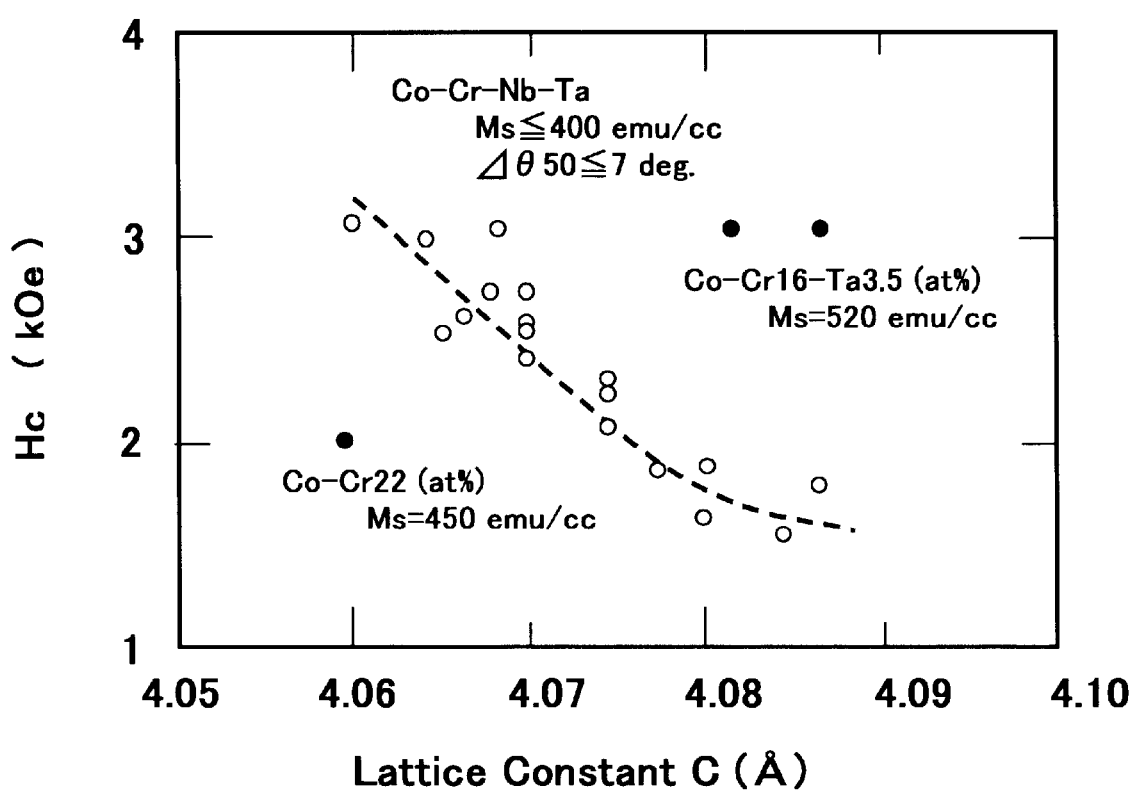
FIG. 2 is a graph showing a relation between a lattice constant c and a coercivity Hc of a perpendicular magnetic recording layer in a perpendicular magnetic recording medium of the present invention.

FIG. 2 is a graph showing a relation between a lattice constant c and a coercivity Hc of a perpendicular magnetic recording layer in a perpendicular magnetic recording medium of the present invention.

In FIG. 2, an abscissa designates the lattice constant c and an ordinate designates the coercivity Hc in the perpendicular magnetic recording medium. In the FIG. 2, marks ○ represent data of a sample having the perpendicular magnetic recording layer of Co—Cr—Nb—Ta having a saturation magnetization Ms of not more than 400 emu/cc. As seen from FIG. 2, the less the lattice constant c, the more the coercivity Hc becomes, and it is possible to obtain a coercivity Hc of not less than 2,500 Oe by making the lattice constant c not more than 4.07 A under the condition that a saturation magnetization is not more than 400 emu/cc.

Incidentally, in FIG. 2, marks ● represent data of samples of the perpendicular magnetic recording layers of Co—Cr16—Ta 3.5 (at %) and Co—Cr 22 (at %), wherein respective samples have a saturation magnetization Ms of more than 400 emu/cc, i.e., Ms=520 emu/cc and Ms=450 emu/cc. As seen from FIG. 2, these samples show a different inclination compared with the ones having a saturation magnetization Ms of not more than 400 emu/cc.

Figure 3:
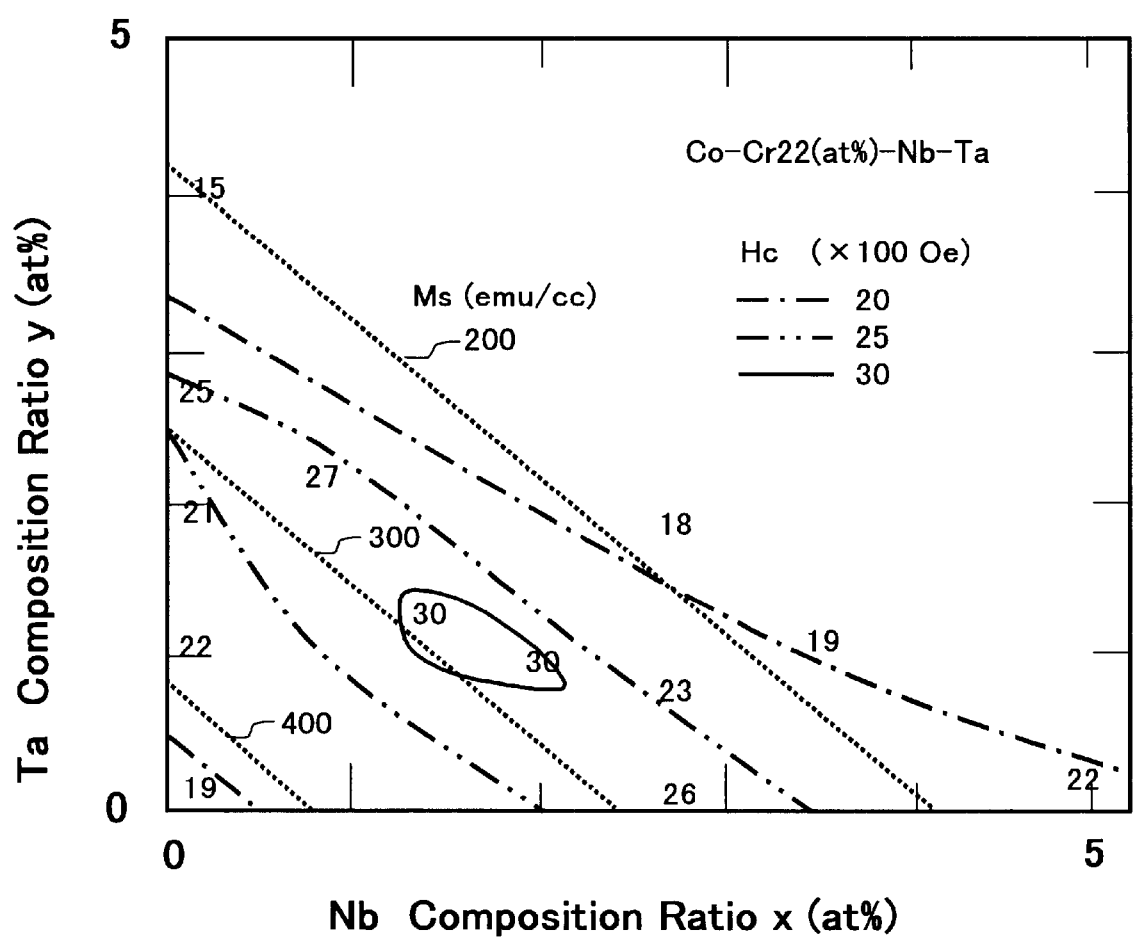
FIG. 3 is a graph showing a relation between a coercivity Hc and composition ratios (at %) of Nb and Ta in a perpendicular magnetic recording layer of a Co—Cr—Nb—Ta system alloy.

FIG. 3 is a graph showing a relation between a coercivity Hc and composition ratios (at %) of Nb and Ta in a perpendicular magnetic recording layer of a Co—Cr—Nb—Ta system alloy.

In the Co—Cr—Nb—Ta system alloy shown in FIG. 3, a composition ratio of Cr is made to be a fixed value of 22 at % and composition ratios of Nb and Ta are made to be variable values of x and y (at %), respectively, thus a composition ratio of Co is determined as {100−(22+x+y)} (at %).

Referring to FIG. 3, when the abscissa represents a composition ratio y (at %) of Ta and the coordinate represents a composition ratio y (at %) of Nb, the perpendicular magnetic recording medium shows a high coercivity Hc of not more than 2,500 Oe when the composition ratios x, y satisfy the following inequalities (1) and (2) under condition that a saturation magnetization is within 250 to 350 emu/cc. (It should be noted that scales of the saturation magnetization are represented by using broken lines.)

$$x+y \geq 2 \quad (1)$$

$$3x/4+y \leq 3 \quad (2)$$

wherein x and y are above zero.

Further, in a case where the composition ratios x, y do not satisfy the inequalities (1) and (2), the perpendicular magnetic recording medium shows the same effect as that mentioned above under a condition that the lattice constant c is made to be not more than 4.07 Å as long as the saturation magnetization is made to be 250 to 350 emu/cc as described in the foregoing.

FIG. 4 is a table showing various kinds of characteristics of a perpendicular magnetic recording medium of the present invention and comparative examples.

In FIG. 4, a reference character A represents an embodiment of a perpendicular magnetic recording medium having a magnetic recording layer of a 4-element system alloy of Co—Cr—Nb—Ta according to the present invention, B and C comparative examples, each having a perpendicular magnetic recording layer of a 3-element system alloy of Co—Cr—Ta of which lattice constant c is made to be large compared with that of the embodiment of the present invention. The comparative example B has a comparatively high coercivity Hc and saturation magnetization, and the comparative example C has a comparatively low coercivity Hc and saturation magnetization. As to these embodiment A and comparative examples B, C, there were measured medium S/N (dB) and medium noise (μ Vrms) at 100 kfci (kilo flux change per inch).

As seen from FIG. 4, the embodiment A of the present invention shows better results in S/N (dB) and recording medium noise (μ Vrms) than the comparative examples B and C.

Figure 5:
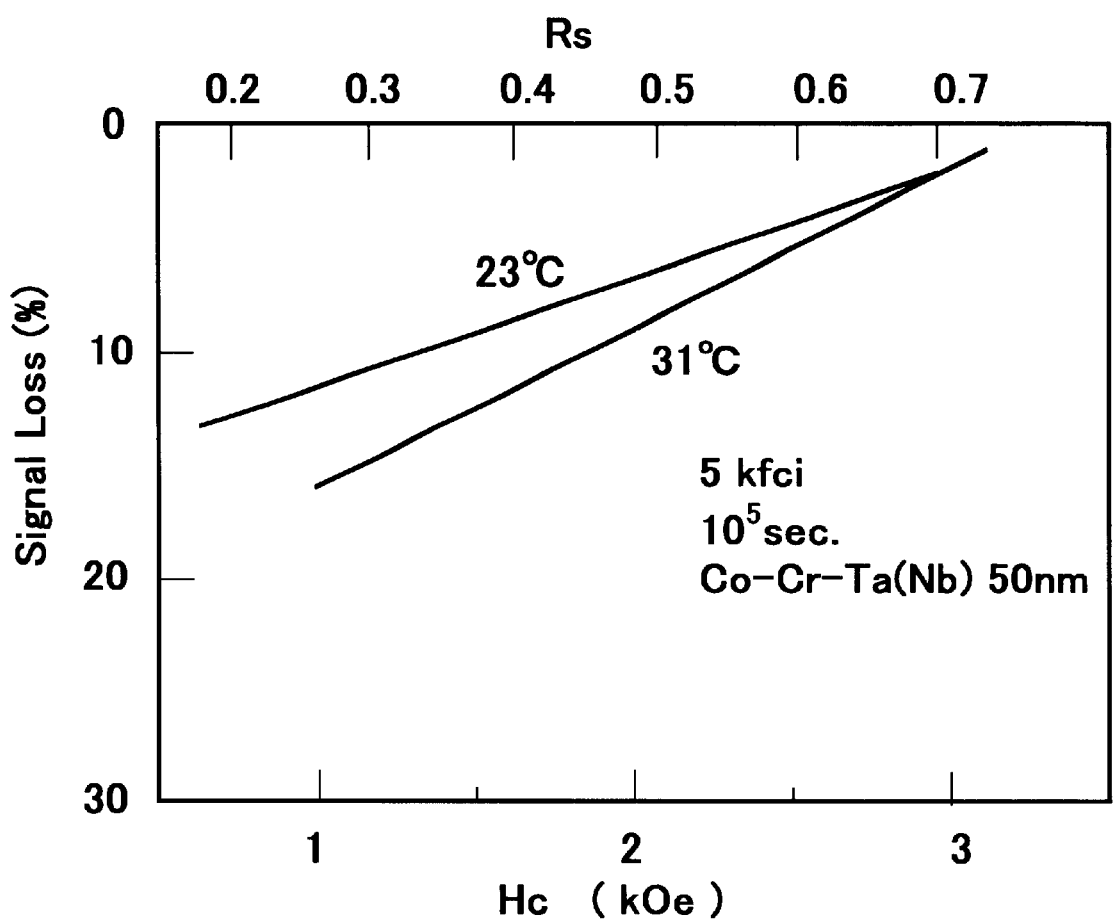
FIG. 5 is a graph showing thermal demagnetization characteristics of a perpendicular magnetic recording medium of the present invention.

FIG. 5 is a graph showing thermal demagnetization characteristics of a perpendicular magnetic recording medium of the present invention.

In FIG. 5, an abscissa represents a signal loss (%) due to thermal demagnetization or thermal relaxation and a coordinate represents a coercivity of the perpendicular magnetic recording medium.

The thermal demagnetization characteristics of the perpendicular magnetic recording medium of the present invention shown in FIG. 5 were obtained from the perpendicular magnetic recording medium having various values of coercivity in FIG. 3 by actually recording a low density signal of 5 kfci thereon and measuring signal losses thereof after maintaining them for $10^5$ sec in a temperature of 23° C. and a temperature of 31° C., respectively. As a recording magnetic head, there was used an inductive single pole type (SPT) head having a track width of 10 μm, a main magnetic pole thickness of 0.4 μm and a coil of 26 turns, and as a reproducing magnetic head, there was also used an inductive single pole type (SPT) head having a track width of 3.5 μm, a main magnetic pole thickness of 0.4 μm and a coil of 26 turns. The reason why the low density recording signal of 5 kfci was chosen is that a large demagnetization field is generated in a low density signal compared with that in a high density signal in the perpendicular magnetic recording, resulting in that the thermal demagnetization is easily caused.

In a perpendicular magnetic recording medium having a coercivity Hc of not less than 2,500 Oe according to the present invention, a signal loss due to the thermal demagnetization is small enough to be within 5%. Thus, the affect of thermal demagnetization is very small in the perpendicular magnetic recording medium according to the present invention. This reason is considered that the demagnetization field is reduced because of an improvement of the squareness ratio as well as the coercivity Hc.

According to the perpendicular magnetic recording medium of the present invention, it is possible to provide one having a small recording medium noise, a high reproducing output, an excellent S/N and an excellent thermal stability of recorded signals. Further, it is possible to provide the perpendicular magnetic recording medium capable of reducing a production cost because no high cost materials are used in the perpendicular magnetic recording layer.

What is claimed is:

1. A perpendicular magnetic recording medium comprising, at least, a perpendicular magnetic recording layer having a hexagonal closest packing (hcp) structure of which c-axis is perpendicular to a surface of the perpendicular magnetic recording layer, on a non-magnetic base, wherein the perpendicular magnetic recording layer has a saturation magnetization Ms of not more than 400 emu/cc, and a lattice constant c of the hexagonal closest packing structure is not more than 4.07 Å, such that the coercivity Hc of the recording medium is not less than 2500 Oe and the squareness ratio Rs is not less than 0.6; and wherein the magnetic recording layer comprises: a 4-element system alloy of Co—Cr—Nb—Ta, and when composition ratios of Nb and Ta are made to be x (at %) and y (at %), respectively, the 4-element system alloy satisfies inequalities (1) and (2) as follows:

$$x+y \geq 2 \quad (1)$$

$$3x/4+y \leq 3 \quad (2)$$

and wherein x and y are each above zero.

2. A perpendicular magnetic recording medium comprising, at least, a perpendicular magnetic recording layer having a hexagonal closest packing (hcp) structure of which c-axis is perpendicular to a surface of the perpendicular magnetic recording layer, on a non-magnetic base, wherein the perpendicular magnetic recording layer has a saturation magnetization Ms of not more than 400 emu/cc, and a lattice constant c of the hexagonal closest packing structure is not more than 4.07 Å, such that the coercivity Hc of the recording medium is not less than 2500 Oe and the squareness ratio Rs is not less than 0.6; and wherein a Co—Zr system amorphous soft magnetic under layer is formed under the perpendicular magnetic recording layer so that atoms of the perpendicular magnetic recording layer are directly coupled with atoms of the Co—Zr system amorphous soft magnetic under-layer.

3. A perpendicular magnetic recording medium as claimed in claim 2, wherein a pinning layer is formed under the Co—Zr system amorphous soft magnetic underlayer so as to pin magnetic domains of the Co—Zr system amorphous soft magnetic under-layer.

* * * * *